(12) United States Patent
Lee et al.

(10) Patent No.: US 9,893,372 B2
(45) Date of Patent: Feb. 13, 2018

(54) PERCEIVING METHOD AND SYSTEM OF STACK STATE FOR FUEL CELL SYSTEM

(71) Applicant: Hyundai Motor Company, Seoul (KR)

(72) Inventors: Hyun Jae Lee, Seoul (KR); Hyo Seop Kim, Gyeonggi-do (KR); Yei Sik Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 313 days.

(21) Appl. No.: 14/696,446

(22) Filed: Apr. 26, 2015

(65) Prior Publication Data

US 2016/0172693 A1 Jun. 16, 2016

(30) Foreign Application Priority Data

Dec. 12, 2014 (KR) ........................ 10-2014-0179068

(51) Int. Cl.
*H01M 8/04492* (2016.01)
*H01M 8/04746* (2016.01)

(52) U.S. Cl.
CPC ... *H01M 8/04492* (2013.01); *H01M 8/04522* (2013.01); *H01M 8/04746* (2013.01); *H01M 8/04753* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| 2009/0142633 A1* | 6/2009 | Kizaki | B60L 11/1885 429/413 |
| 2012/0003557 A1* | 1/2012 | Tanaka | B60L 11/1885 429/429 |
| 2012/0171590 A1* | 7/2012 | Matsumoto | H01M 8/04253 429/442 |

FOREIGN PATENT DOCUMENTS

| JP | 2007-128773 A | 5/2007 |
| KR | 10-2010-0052058 A | 5/2010 |
| KR | 10-2014-0079154 A | 6/2014 |
| KR | 10-2014-0083764 A | 7/2014 |

* cited by examiner

*Primary Examiner* — Lucas J. O'Donnell
(74) *Attorney, Agent, or Firm* — Mintz Levin Cohn Ferris Glovsky and Popeo, P.C.

(57) ABSTRACT

A perceiving method and system of a stack state for a fuel cell system is provided. The method includes determining whether a vehicle provided with the fuel cell system is started and calculating a time until first condensate water is discharged through a condensate water discharging valve provided in the fuel cell system after the vehicle starts. Then, an average time until the first condensate water is discharged after the vehicle starts, at the previous starting of the vehicle is calculated over a predetermined number of times. The two calculated times are compared to determine the state of the stack or cathode of the fuel cell system without requiring additional separate components.

12 Claims, 5 Drawing Sheets

PERCEIVING METHOD AND SYSTEM OF STACK STATE FOR FUEL CELL SYSTEM

CROSS-REFERENCE TO RELATED APPLICATION

This application is based on and claims the benefit of priority to Korean Patent Application No. 10-2014-0179068, filed on Dec. 12, 2014 in the Korean Intellectual Property Office, the disclosure of which is incorporated herein in its entirety by reference.

TECHNICAL FIELD

The present disclosure relates to a perceiving method of a stack state for a fuel cell system, and more particularly, to a perceiving method of a stack state for a fuel cell system capable of perceiving a dry state or a wet state within a stack or a cathode by utilizing an open period or a discharge rate of a condensate water discharging valve disposed within a fuel cell system of a vehicle without adding separate components or without having mapping data through a pre-test.

BACKGROUND

In general, a fuel cell is a type of device that generates electricity by electrochemically reacting chemical energy of the fuel in a fuel cell stack to be converted into electrical energy, and supplies a power for industry, family use, and driving of a vehicle. According to the related art, a vehicle has such a fuel cell system provided therein.

To estimate humidity within the fuel cell in the existing fuel cell system of the related art, a humidity sensor is mounted for actual measurement or current blocking or a change in resistance values is measured, and humidity is estimated through mapping data by pre-measuring temperature/pressure/humidity of a peripheral part of the fuel cell system. However, according to the related art, to perceive an inside of the stack of the fuel cell system, since the mapping data is required by adding separate components or performing a pre-test, efficiency and accuracy may be deteriorated.

SUMMARY

The present disclosure provides a perceiving method of a stack state for a fuel cell system capable of perceiving a dry state or a wet state within a stack or a cathode by utilizing an open period or a discharge rate of a condensate water discharging valve disposed within a fuel cell system of a vehicle while eliminating the need for adding separate components or having mapping data through a pre-test.

According to an exemplary embodiment of the present disclosure, a perceiving method of a stack state for a fuel cell system, may include: starting a vehicle provided with the fuel cell system; calculating a time until first condensate water is discharged through a condensate water discharging valve disposed within the fuel cell system after the vehicle starts; calculating an average time until the first condensate water is discharged during the previous starting of the vehicle over a predetermined number of times; and determining a state of a stack or a cathode of the fuel cell system.

The perceiving method may further include: determining the stack or the cathode of the fuel cell system as a dry state when the time first condensate water is discharged is greater than the average time until the first condensate water is discharged; and determining the stack or the cathode of the fuel cell system as a wet state when the time of the average time until the first condensate water is discharged is greater than the time first condensate water is discharged. An air flow or an operating pressure may be changed based on the state of the stack or the cathode of the fuel cell system.

When the stack or the cathode is determined as the dry state, a water amount may be increased by operating the stack or adjusting the air flow or the operating pressure of the fuel cell system. When the stack or the cathode is determined as the wet state, a water amount may be decreased by operating the stack or adjusting the air flow or the operating pressure of the fuel cell system.

According to another exemplary embodiment of the present disclosure, a perceiving method of a stack state for a fuel cell system, may include: starting a vehicle provided with the fuel cell system; calculating a period until condensate water is discharged through a condensate water discharging valve disposed within the fuel cell system while driving after the vehicle starts; calculating an average period until the condensate water is discharged while driving during previous starting of the vehicle over a predetermined number of times; and determining a state of a stack or a cathode of the fuel cell system.

The perceiving method may further include: determining the stack or the cathode of the fuel cell system as a dry state when the period until condensate water is discharged is greater than the average period until the condensate water is discharged; and determining the stack or the cathode of the fuel cell system as a wet state when the average period until the condensate water is discharged is greater than the period until condensate water is discharged. An air flow or an operating pressure may be changed based on the state of the stack or the cathode of the fuel cell system.

When the stack or the cathode is determined as the dry state, a water amount may be increased by operating the stack or adjusting the air flow or the operating pressure of the fuel cell system. When the stack or the cathode is determined as the wet state, a water amount may be decreased by operating the stack or adjusting the air flow or the operating pressure of the fuel cell system.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the tem) controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a first exemplary embodiment of the present disclosure will be described in detail with reference to the accompanying drawings.

Figure 1:
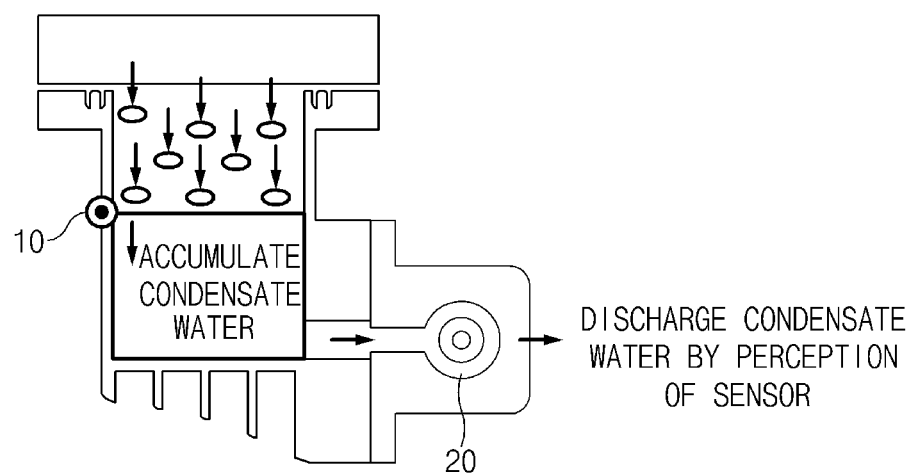
FIG. 1 shows an exemplary fuel cell system according to an exemplary embodiment of the present disclosure.
Figure 2:
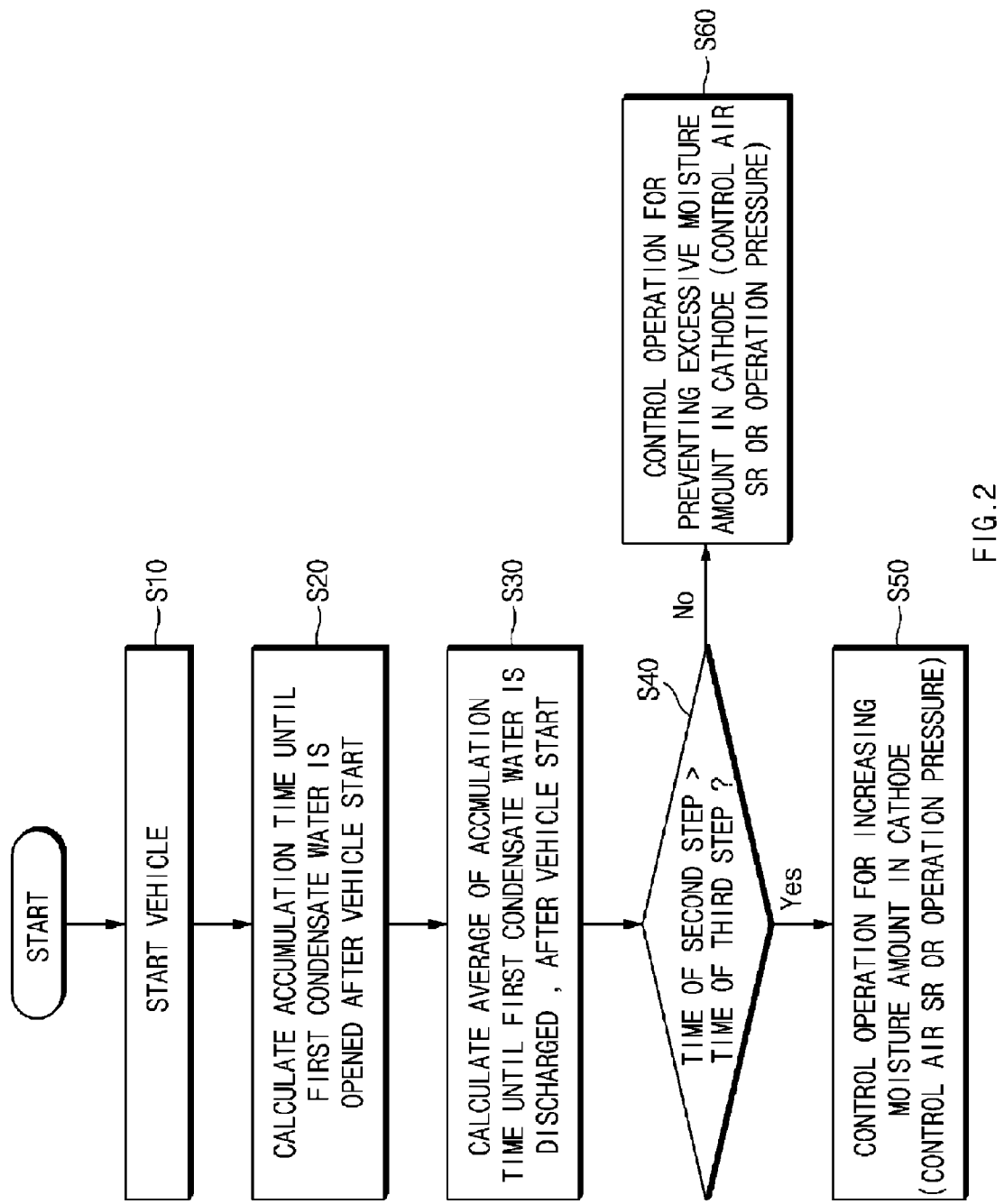
FIG. 2 is an exemplary flow chart showing a first exemplary embodiment of a perceiving method of a stack state for a fuel cell system according to an exemplary embodiment of the present disclosure.
Figure 3:
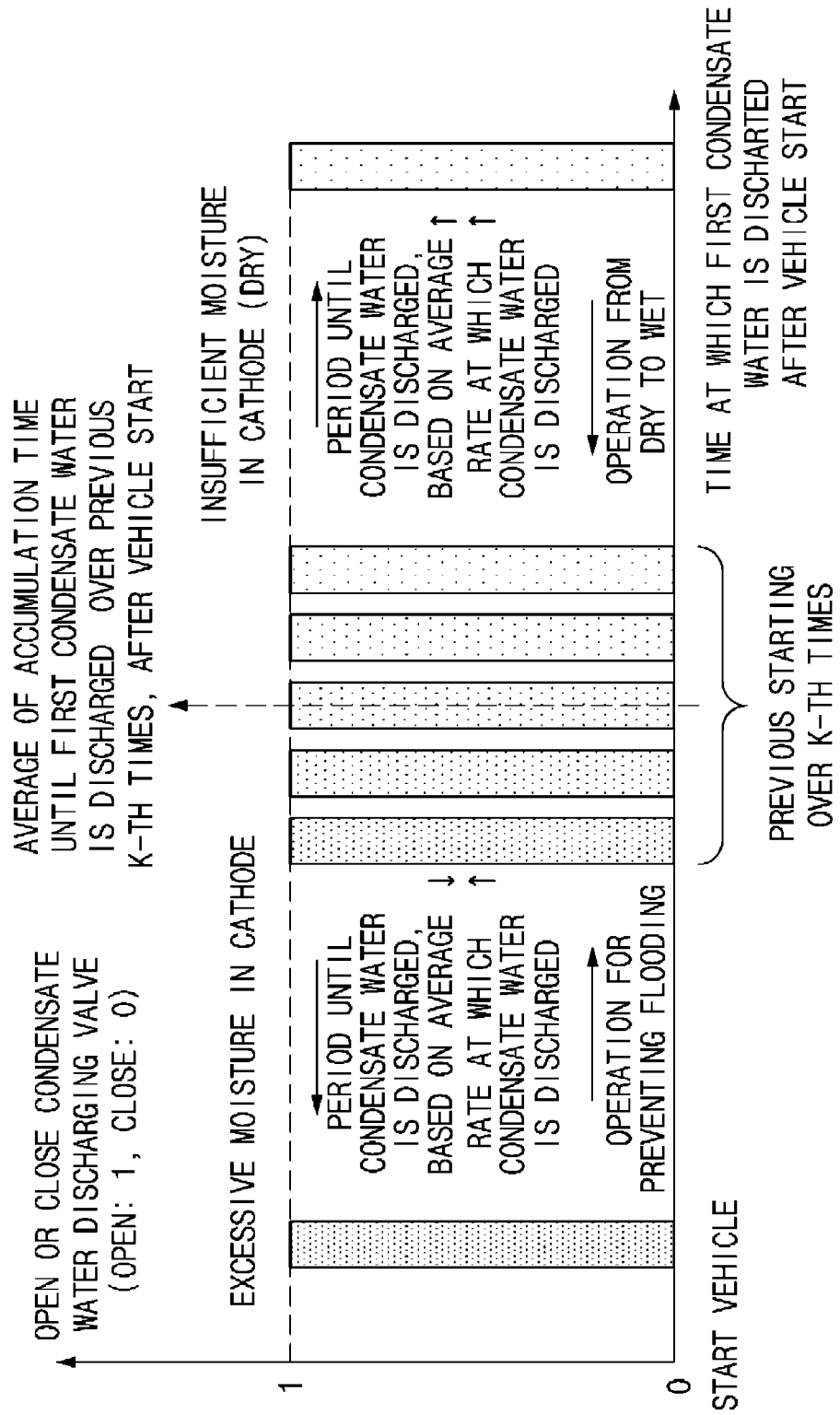
FIG. 3 shows the first exemplary embodiment of the perceiving method of a stack state for a fuel cell system according to an exemplary embodiment of the present disclosure.

A perceiving method of a stack state for a fuel cell system according to the present disclosure may include: (S10) starting a vehicle; (S20) calculating a time until first condensate water is discharged; (S30) calculating an average time until the first condensate water is discharged at the time of previous starting of the vehicle; (S40) comparing the time until first condensate water is discharged and the average time until the first condensate water is discharged; (S50) determining the stack or the cathode of the fuel cell system as a dry state when the time until first condensate water is discharged is greater than the average time until the first condensate water is discharged; and (S60) determining the stack or the cathode of the fuel cell system as a wet state when the average time until the first condensate water is discharged is greater than the time until first condensate water is discharged, as shown in FIGS. 1 to 3. The processes of the perceiving method may be executed by a controller within the fuel cell system.

As shown in FIG. 1, the fuel cell system of the present disclosure has a basic structure of a general fuel cell system in which when a water level at which condensate water is of a predetermined amount or greater is perceived by a sensor 10, the condensate water may be discharged by opening a condensate water discharging valve 20 for a predetermined time, as taught by the related art. In addition to the basic structure, the fuel cell system of the present disclosure is capable of perceiving the dry state and the wet state through a generation time of an on-off signal of the condensate water discharging valve 20 without requiring additional separate components.

As shown in FIGS. 2 and 3, whether a vehicle provided with the fuel cell system starts may be determined and then a time may be calculated until first condensate water is discharged through the condensate water discharging valve 20 indisposed within the fuel cell system. Additionally, an average time may be calculated until the first condensate water is discharged at the time of previous starting of the vehicle over a predetermined number of times, after the vehicle is started.

Further, the time until the condensate water is discharged and the average time until the condensate water is discharged may be compared to determine the state of the stack or the cathode of the fuel cell system. In particular, an air flow or an operating pressure may be adjusted based on the state of the stack or the cathode of the fuel cell system.

When the time until the first condensate water is discharged is greater than that of the average time until the first condensate water is discharged, the stack or the cathode of the fuel cell system may be determined to be in a dry state. Particularly, since the stack or the cathode of the fuel cell system may be determined as being in the dry state, the water amount may be increased by operating the stack or adjusting the air flow or the operating pressure of the fuel cell system for changing the state.

When the average time until the first condensate water is discharged is greater than that of the time until the first condensate water is discharged, the stack or the cathode of the fuel cell system may be determined to be in a wet state. Particularly, since the stack or the cathode of the fuel cell system may be determined as being in the wet state, the water amount may be decreased by operating the stack adjusting or the air flow or the operating pressure of the fuel cell system for changing the state.

Meanwhile, in the stack, two molecules of water ($H_2O$) may be produced on an interface of the cathode by an electrochemical reaction of two molecules of hydrogen and one molecule of oxygen. A predetermined amount of the produced $H_2O$ may be delivered to an anode, and when condensed $H_2O$ is accumulated to be of a predetermined amount, the condensed $H_2O$ may be discharged, according to an operation condition and a configuration of the system. In other words, when the cathode having an effect on performance and deterioration of the stack is in a dry state compared to required water, an amount of the condensate water discharged through the anode may be decreased, and when the cathode is not in a dry state compared to the required water, the amount of the condensate water discharged through the anode may be increased.

Figure 4:
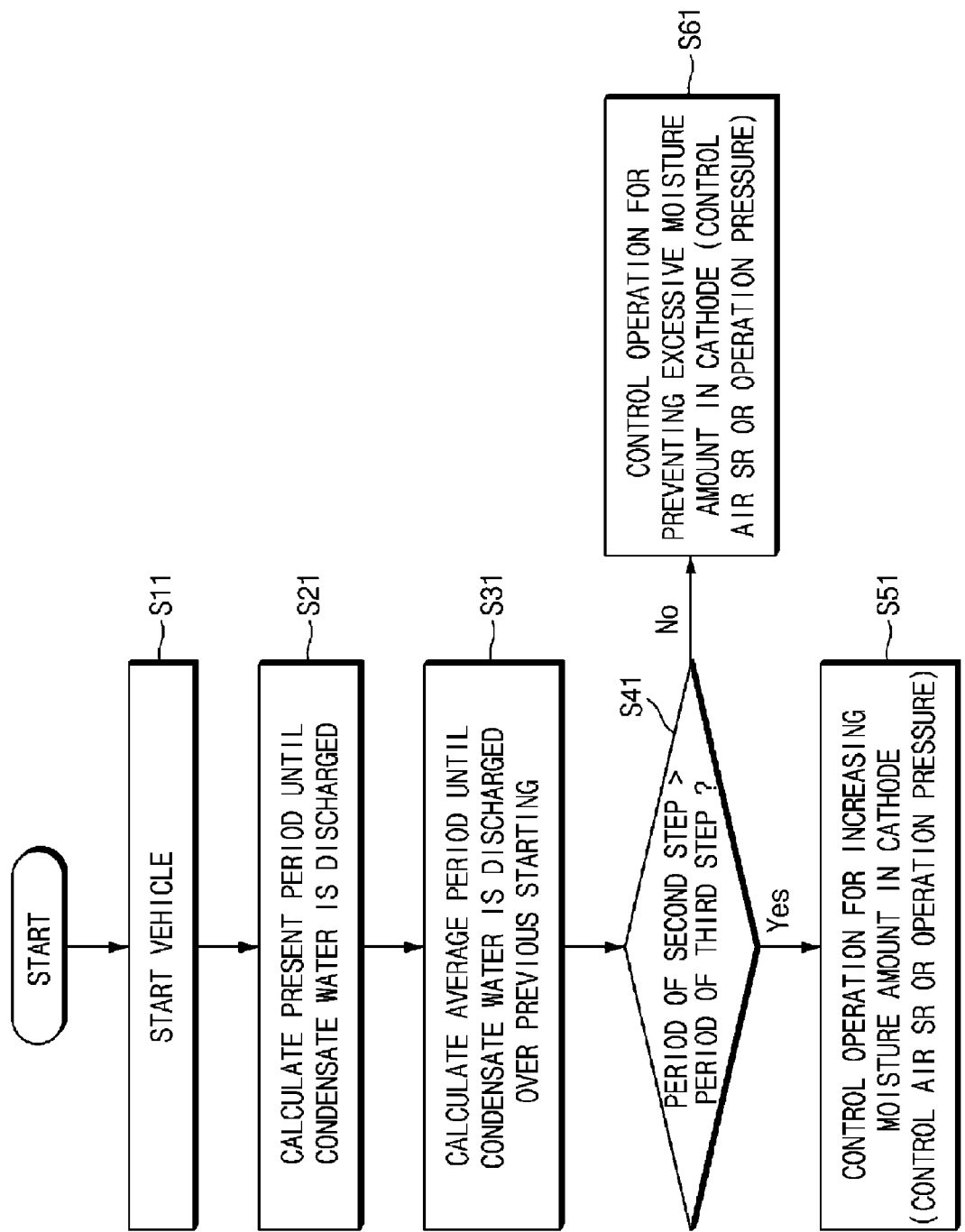
FIG. 4 is an exemplary flow chart showing a second exemplary embodiment of a perceiving method of a stack state for a fuel cell system according to an exemplary embodiment of the present disclosure.
Figure 5:
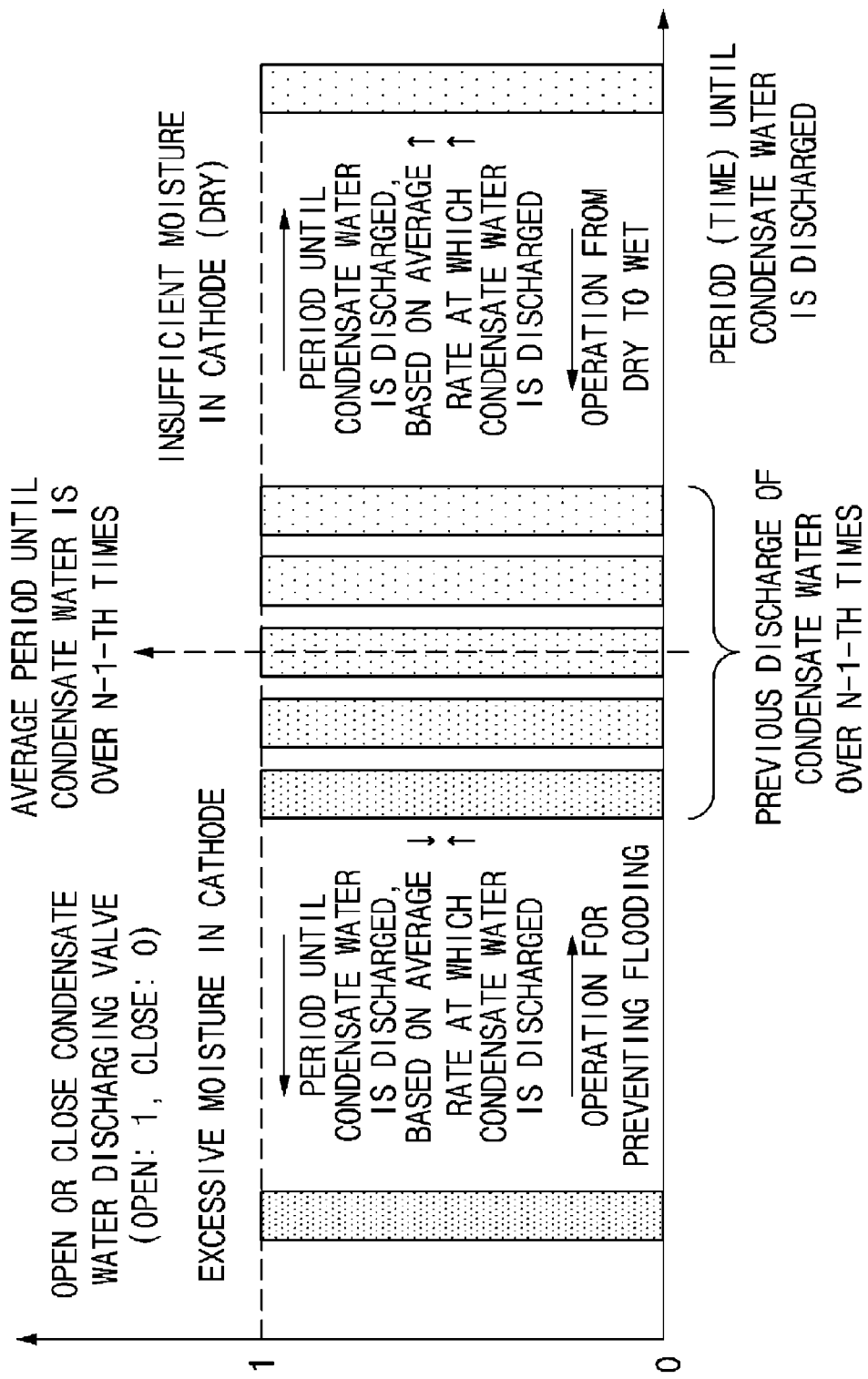
FIG. 5 shows the second exemplary embodiment of the perceiving method of a stack state for a fuel cell system according to an exemplary embodiment of the present disclosure.

A second exemplary embodiment of the present disclosure will be described in detail with reference to the accompanying drawings. A perceiving method of a stack state for a fuel cell system according to the present disclosure may include: (S11) starting a vehicle; (S21) calculating a period until the condensate water is discharged; (S31) calculating an average period until the condensate water is discharged at the time of previous starting of the vehicle; (S41) comparing the calculated period until the condensate water is discharged with the average period until the condensate water is discharged; (S51) determining the stack or the cathode of the fuel cell system as a dry state when the discharge period of the calculated period until the condensate water is discharged is greater than the average period until the condensate water is discharged; and (S61) determining the stack or the cathode of the fuel cell system as a wet state when the average discharge period is greater than the calculated period until the condensate water is discharged, as shown in FIGS. 4 and 5.

As shown in FIG. 1, the fuel cell system of the present disclosure has a basic structure of a general fuel cell system in which when a water level at which condensate water is of a predetermined amount or greater is perceived by a sensor 10, the condensate water may be discharged by opening of a condensate water discharging valve 20 for a predetermined time, as taught by the related art. In addition to the basic structure, the fuel cell system of the present disclosure may be capable of perceiving the dry state and the wet state through a generation time of an on-off signal of the condensate water discharging valve 20 without requiring the addition of separate components. As shown in FIGS. 4 and 5, whether the vehicle provided with the fuel cell system has been started may be determined.

The period until the condensate water is discharged through the condensate water discharging valve 20 indisposed within the fuel cell system may be calculated after the vehicle starts. In addition, an average period until the condensate water is discharged while driving at the time of previous starting of the vehicle may be calculated after the vehicle starts.

In addition, the period until the condensate water is discharged and the average period until the condensate water is discharged may be compared to determine the state of the stack or the cathode of the fuel cell system. In particular, an air flow or an operating pressure may be adjusted based on the state of the stack or the cathode of the fuel cell system.

When the period until the condensate water is discharged is greater than that of the average period until the condensate water is discharged, the stack or the cathode of the fuel cell system may be determined to be in a dry state (S51). Particularly, since the stack or the cathode of the fuel cell system may be determined as the dry state, the water amount may be increased by operating the stack or adjusting the air flow or the operating pressure of the fuel cell system for changing the state.

When the average period until the condensate water is discharged is greater than that of the period until the condensate water is discharged, the stack or the cathode of the fuel cell system may be determined to be in a wet state (S61). In particular, since the stack or the cathode of the fuel cell system may be determined as the wet state, the water amount may be decreased by operating the stack or adjusting the air flow or the operating pressure of the fuel cell system for changing the state.

Meanwhile, in the stack, two molecules of $H_2O$ may be produced on an interface of the cathode by an electrochemical reaction of two molecules of hydrogen and one molecule of oxygen. A predetermined amount of the produced $H_2O$ may be delivered to an anode, and when condensed $H_2O$ is accumulated to be of a predetermined amount, the condensed $H_2O$ may be discharged, according to an operation condition and a configuration of the system. In other words, when the cathode having an effect on performance and deterioration of the stack is in a dry state compared to required water, an amount of the condensate water discharged through the anode may be decreased, and when the cathode is not in a dry state compared to the required water, the amount of the condensate water discharged through the anode may be increased.

As described above, with the perceiving method of a stack state for a fuel cell system according to the exemplary embodiments of the present disclosure, the open period or the discharge rate may be confirmed through the condensate water discharging valve disposed within the fuel cell system without requiring the addition of separate components to thus perceive a dry state or a wet state in the stack or in the cathode, thereby improving efficiency, and information related with an inner state of the stack module may be analyzed, such that as compared to diagnosis and control by an estimator utilizing information of the peripheral part of the stack, improved reliability may be obtained to provide improved commercial value.

Although the present disclosure has been described with reference to exemplary embodiments and the accompanying drawings, it would be appreciated by those skilled in the art that the present disclosure is not limited thereto but various modifications and alterations might be made without departing from the idea of the present disclosure and the scope defined in the claims.

What is claimed is:

1. A perceiving method of a stack state for a fuel cell system, comprising the steps of:
   (a) determining, by a controller, whether a vehicle provided with the fuel cell system is started;
   (b) calculating, by the controller, a time until first condensate water is discharged through a condensate water discharging valve disposed within the fuel cell system after the vehicle starts;
   (c) comparing, by the controller, the time and a predetermined average time;
   (d) determining, by the controller, a cathode of a stack to be in a dry state in which a water amount of the cathode is less than a predetermined reference amount when the time is greater than the average time; and
   (e) determining, by the controller, the cathode to be in a wet state in which the water amount of the cathode is greater than the predetermined reference amount when the average time is greater than the time.

2. The perceiving method according to claim 1, wherein the predetermined average time is determined by calculating the predetermined average time of at least one time for discharging the first condensate water for the condensate water discharging valve before the step (a).

3. The perceiving method according to claim 1, further comprising the step of:
   (f) increasing, by the controller, the water amount by adjusting an air flow of the cathode or a pressure of the cathode when the cathode is determined to be in the dry state.

4. The perceiving method according to claim 1, further comprising the step of:
   (g) decreasing, by the controller, the water amount by adjusting an air flow of the cathode or a pressure of the cathode when the cathode is determined to be in the wet state.

5. A perceiving method of a stack state for a fuel cell system, comprising the steps of:
   (a) determining, by a controller, whether a vehicle provided with the fuel cell system is in a state of driving;
   (b) calculating, by the controller, a period until condensate water is discharged through a condensate water discharging valve disposed within the fuel cell system when the vehicle is determined to be in the state of driving;
   (c) comparing, by the controller the period and a predetermined average period;
   (d) determining, by the controller, a cathode of a stack to be in a dry state in which a water amount of the cathode is less than a predetermined reference amount when the period is greater than the predetermined average period; and
   (e) determining, by the controller, the cathode to be in a wet state in which the water amount of the cathode is greater than the predetermined reference amount when the predetermined average period is greater than the period.

6. The perceiving method according to claim 5, wherein the predetermined average period is determined by calculating the predetermined average period of at least one period for discharging the condensate water discharging valve before the step (a).

7. The perceiving method according to claim 5, further comprising the step of:
 (f) increasing, by the controller, the water amount by adjusting an air flow of the cathode or a pressure of the cathode when the cathode is determined to be in the dry state.

8. The perceiving method according to claim 5, further comprising the step of:
 (g) decreasing, by the controller, the water amount by adjusting an air flow of the cathode or a pressure of the cathode when the cathode is determined to be in the wet state.

9. A perceiving system of a stack state for a fuel cell system, comprising:
 a memory storing program instructions; and
 a processor programmed to execute the program instructions, the program instructions when executed:
 (a) determine whether a vehicle provided with the fuel cell system is started;
 (b) calculate a time until first condensate water is discharged through a condensate water discharging valve disposed within the fuel cell system after the vehicle starts;
 (c) compare the time and a predetermined average time;
 (d) determine a cathode of a stack to be in a dry state in which a water amount of the cathode is less than a predetermined reference amount when the time is greater than the average time; and
 (e) determine the cathode to be in a wet state in which the water amount of the cathode is greater than the predetermined reference amount when the average time is greater than the time.

10. The perceiving system according to claim 9, wherein the predetermined average time is determined by calculating the predetermined average time of at least one time for discharging the first condensate water for the condensate water discharging valve before the step (a).

11. The perceiving system according to claim 9, wherein the program instructions when executed:
 (f) increase the water amount by adjusting an air flow of the cathode or a pressure of the cathode when the cathode is determined to be in the dry state.

12. The perceiving system according to claim 9, wherein the program instructions when executed:
 (g) decrease the water amount by adjusting an air flow of the cathode or a pressure of the cathode when the cathode is determined to be in the wet state.

* * * * *